United States Patent [19]

Sato et al.

[11] 4,077,937

[45] Mar. 7, 1978

[54] CURABLE ORGANOPOLYSILOXANE COMPOSITIONS

[75] Inventors: Yasuhiko Sato; Toshio Shiobara, both of Annaka, Japan

[73] Assignee: Shin-Etsu Chemical Co., Ltd., Tokyo, Japan

[21] Appl. No.: 743,068

[22] Filed: Nov. 18, 1976

[30] Foreign Application Priority Data

Nov. 27, 1975 Japan .................................. 50-141737

[51] Int. Cl.$^2$ ............................................. C08L 83/04
[52] U.S. Cl. ............................... 260/37 SB; 260/18 S; 260/46.5 G; 260/46.5 UA
[58] Field of Search ................. 260/46.5 UA, 46.5 G, 260/37 SB, 825, 18 S

[56] References Cited

U.S. PATENT DOCUMENTS

| | | | |
|---|---|---|---|
| 3,445,420 | 5/1969 | Kookootsedes et al. | 260/46.5 UA |
| 3,882,083 | 5/1975 | Berger et al. | 260/46.5 UA |
| 3,989,666 | 11/1975 | Niemi | 260/46.5 UA |

*Primary Examiner*—Melvyn I. Marquis
*Attorney, Agent, or Firm*—Toren, McGeady and Stanger

[57] ABSTRACT

An organopolysiloxane composition is proposed which is of the type curable by the addition reaction type and containing, as the retarding agent for crosslinking, an organic compound having one or more acetylenic triple bonds and —O—CO—NH— groups in the molecule, is readily cured by heating but can be stored for a long period of time without gelling. The composition usable as silicone elastomers, molding compounds, and the like.

12 Claims, No Drawings

CURABLE ORGANOPOLYSILOXANE COMPOSITIONS

BACKGROUND OF THE INVENTION

This invention relates to a curable organopolysiloxane composition. In particular, the invention relates to an organopolysiloxane composition which is stable at room temperature without gelling but readily cures upon heating at elevated temperatures.

Heat curable organopolysiloxane compositions are known which comprise an organopolysiloxane having aliphatically unsaturated monovalent hydrocarbon groups bonded directly to the silicon atoms, an organohydrogenpolysiloxane having hydrogen atoms bonded directly to the silicon atoms and platinum or a platinum compound as a catalyst. The prior art organopolysiloxane compositions have a disadvantage in that they are prone to gelation even at room temperature during prolonged storage before use.

Several methods have been proposed to increase the stability of the organopolysiloxane compositions during storage by adding certain reagents to retard the cross-linking at room temperature. Several of the retarding agents used for this purpose in the art include tin compounds (see, for example, U.S. Pat. No. 3,532,649), isocyanurate compounds (see, for example U.S. Pat. No. 3,882,083), sulfoxide compounds (see, for example, U.S. Pat. No. 3,453,234), and aminosilanes (see, for example, U.S. Pat. No. 3,723,567).

Those prior art methods for the stabilization of the composition are disadvantageous in that that the the retarding agents must be used in large amounts and hence, the eventual decreases in the curing velocity result in difficult or insufficient cure of the composition even at elevated temperatures.

Further, acetylenically unsaturated compounds have been proposed as the retarding agents (see, for example, U.S. Pat. No. 3,445,420). The compounds have a boiling point in the range from 25° C and 250° C, and are free of nitrogen, carboxyl, phosphorus, mercapto groups, and carbonyl groups which are alpha to aliphatically unsaturated carbon atoms. The use of such acetylenic compounds is disadvantageous from the point of view that a compound having a relatively low boiling point tends to make the stability of the finished composition insufficient even at room temperature due to evaporation loss while, on the other hand, a compound having a relatively high boiling point brings about unsatisfactory cure to the finished compositions subjected to heating.

SUMMARY OF THE INVENTION

The primary object of the present invention is therefore to provide a novel and improved curable organopolysiloxane composition free from the abovedescribed disadvantages encountered in the prior art methods.

In accordance with the present invention there is provided a curable organopolysiloxane composition comprising (a) an organopolysiloxane having in a molecule at least two aliphatically unsaturated monovalent hydrocarbon groups bonded directly to the silicon atoms and expressed by the average unit formula $$(R^1)_a SiO_{4-a/2} \quad (I)$$

where $R^1$ is a substituted or unsubstituted monovalent hydrocarbon group and $a$ is a positive number from 0.8 to 3.0 inclusive, (b) an organohydrogenpolysiloxane having in a molecule at least two hydrogen atoms bonded directly to the silicon atoms and expressed by the average unit formula $$(R^2)_b(H)_c SiO_{4-b-c/2} \quad (II)$$

where $R^2$ is a substituted or unsubstituted monovalent hydrocarbon group free of aliphatic unsaturation, $b$ is a positive number in the range of from 0.5 to 2.09 inclusive, and $c$ is a positive number in the range of from 0.01 to 1.2 inclusive, with the proviso that $b+c$ is between 1.0 and 3.0 inclusive, the amount of the organohydrogenpolysiloxane being such that from 0.6 to 2.5 hydrogen atoms bonded directly to the silicon atoms are provided per aliphatically unsaturated monovalent hydrocarbon group in component (a), (c) platinum or a platinum compound in a catalytic amount, and (d) an organic compound having in a molecule at least one monovalent group represented by the general formula $$R^3-O-\overset{\overset{\displaystyle O}{\|}}{C}-\overset{\overset{\displaystyle H}{|}}{N}- \quad (III)$$

or $$-O-\overset{\overset{\displaystyle O}{\|}}{C}-\overset{\overset{\displaystyle H}{|}}{N}-R^3 \quad (IV)$$

where $R^3$ is a monovalent hydrocarbon group having at least one acetylenic triple bond, the amount of the organic compound being such that at least two acetylenic triple bonds are provided per platinum atom in component (c).

The compositions of this invention have been obtained as a result of extensive investigations by the inventors to establish a formulation of the curable organopolysiloxane compositions which are very stable at room temperature even after prolonged storage but rapidly cure when heated at an elevated temperature. The invention is based on and characterized by the discovery that the organic compounds having at least one organic group represented by formula (III) above in the molecule are surprisingly suitable for use as the retarding agent in the organopolysiloxane compositions which are curable by the mechanism of the so-called hydrosilation without any undesirable effect on curability at elevated temperatures, and that the organic compounds have little volatility such that no evaporation takes place during storage at room temperature.

The composition of the invention is useful particularly for the preparation of silicone molding compounds, for which rapid curing is a most important factor.

DETAILED DESCRIPTION OF THE PREFERRED EMBODIMENTS

The organopolysiloxane as component (a) in the composition of the present invention expressed by the average unit formula (I) must have, in a molecule, at least two aliphatically unsaturated monovalent hydrocarbon groups bonded directly to the silicon atoms, which are exemplified by vinyl, allyl, methallyl, butenyl, ethynyl, propynyl, butadienyl and cyclopentenyl groups. Symbol $R^1$ in the formula represents a substituted or unsubstituted monovalent hydrocarbon group, at least two of the groups represented by $R^1$ in a molecule being selected from the above-mentioned aliphatically unsaturated monovalent hydrocarbon groups. The groups $R^1$ other than the aliphatically unsaturated hydrocarbon groups are selected from the class consisting of alkyl groups, such as methyl, ethyl, propyl, isopropyl, butyl, tert-butyl, octyl and dodecyl groups; cycloalkyl groups, such as cyclopentyl and cyclohexyl groups; cyanoalkyl groups, such as 2-cyanoethyl and 2-cyanopropyl groups; aryl groups, such as phenyl, tolyl, naphthyl and xylyl groups; aralkyl groups, such as 2-phenylethyl group; and halogen-substituted monovalent hydrocarbon groups, such as chloromethyl, 3,3,3-trifluoropropyl, 2,3-dibromocyclopentyl, iodophenyl and dichloronaphthyl groups. Among the abovementioned groups $R^1$ without aliphatic unsaturation, the most widely employed are methyl, ethyl and phenyl groups.

The value of $a$ in formula (I) representing component ($a$) is in the range of from 0.8 to 3.0 or, preferably, from 1.0 to 2.7. The particularly desired composition as a silicone molding compound especially for transfer molding is preferred to have the value in the range from 1.0 to 1.8.

The molecular configurations of the organopolysiloxane may be linear or branched chain, or cyclic, though not limitative thereto. Further the organopolysiloxane may be an oily fluid, gum or resin in nature.

Next, the organohydrogenpolysiloxane as component ($b$) in the composition of the present invention is expressed by the average unit formula (II) and must have, in a molecule, at least two hydrogen atoms bonded directly to the silicon atoms. Symbol $R^2$ in the formula represents a substituted or unsubstituted monovalent hydrocarbon group having no aliphatic unsaturation, such as the same alkyl, cycloalkyl, aryl and aralkyl groups as $R^1$. In the formula, $b$ and $c$ are each positive numbers ranging from 0.5 to 2.09 and from 0.01 to 1.2, respectively, with the proviso that $b+c$ is between 1.0 and 3.0.

The examples of the organohydrogenpolysiloxane suitable as component ($b$) are a diorganopolysiloxane terminated at both chain ends with dimethylhydrogensilyl groups, a copolymeric organohydrogenpolysiloxane composed of dimethylsiloxane units, methylhydrogensiloxane units and trimethylsilyl groups as the endblocking groups, a low viscosity organohydrogenpolysiloxane fluid composed of dimethylhydrogensiloxy units and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane and 1,5-dihydrogen-3,7-dihexyl-1,3,5,7-tetramethylcyclotetrasiloxane. The molecular configurations of these organohydrogenpolysiloxanes include linear chain, branched chain and ring structure.

It is natural that component ($b$) should have a good compatibility with component ($a$) in blending into a composition in accordance with the present invention. For example, a methylhydrogenpolysiloxane as component ($b$) is incompatible with an organopolysiloxane as component ($a$) having a considerable amount of phenyl groups.

The amount of component ($b$) to be used is preferably in a range such that from 0.6 to 2.5 hydrogen atoms bonded directly to the silicon atoms are provided per one of the aliphatically unsaturated monovalent hydrocarbon groups in component ($a$).

Platinum or a platinum compound as component ($c$) in the composition of the present invention serves as a catalyst to accelerate the addition reaction between components ($a$) and ($b$). Illustrative of the platinum compounds are chloroplatinic acid, complexes of chloroplatinic acid with olefins or coordination compounds of platinum with alcohols. The amount of component ($d$) to be used is determined in accordance with the desired velocity of curing, usually below 500 p.p.m. by weight or, preferably, in the range from 1 to 50 p.p.m. by weight based on the combined amount of components ($a$) and ($b$).

Component ($d$) in the composition of the present invention is an organic compound having, in a molecule, at least one monovalent group represented by the general formula (III) or (IV) above. Symbol $R^3$ in the formulas represents a hydrocarbon group having at least one acetylenically unsaturated triple bond in the structure.

The organic compounds as component ($d$) are readily produced, for example, by the reaction of an alcohol and an isocyanate compound, both or either of which have at least one acetylenic triple bond in the molecule, and the products may well be exemplified by combinations of the alcohols and isocyanate compounds.

The isocyanate compounds as the reactant are monoisocyanate, diisocyanate or triisocyanate compounds, either aliphatic or aromatic, and may be exemplified by naphthalene isocyanates, biphenyl isocyanates, tolylene diisocyanates, 3,3'-bitolylene 4,4'-diisocyanate, diphenylmethane diisocyanates, 3,3'-dimethyldiphenylmethane-4,4'-diisocyanate, hexamethylene diisocyanate and phenyl isocyanate.

The alcohols as the other reactant are exemplified by the compounds expressed by the following formulas:

(1)

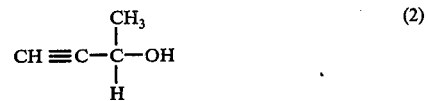

(2)

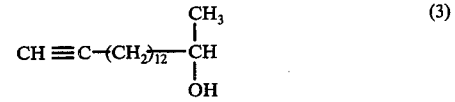

(3)

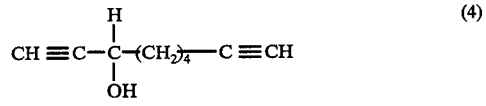

(4)

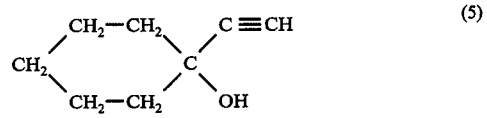

(5)

(6)

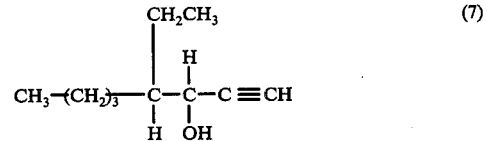

(7)

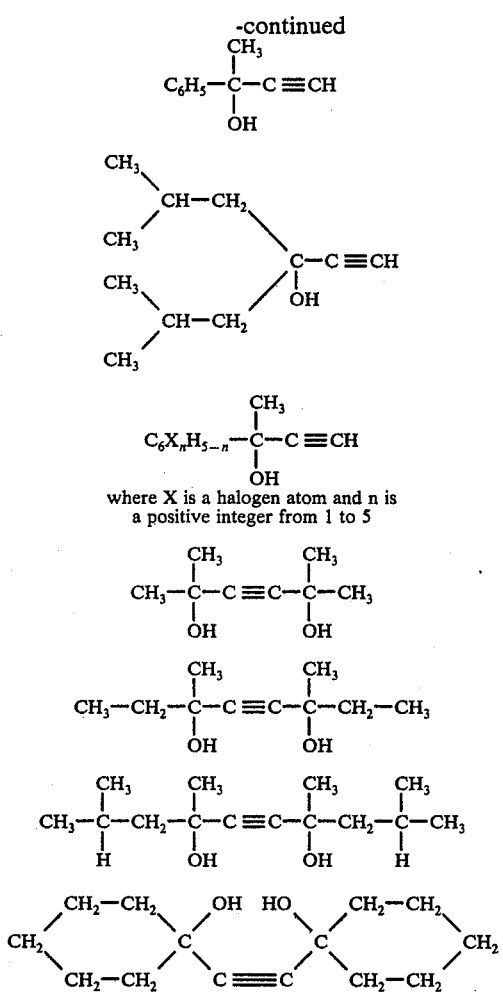

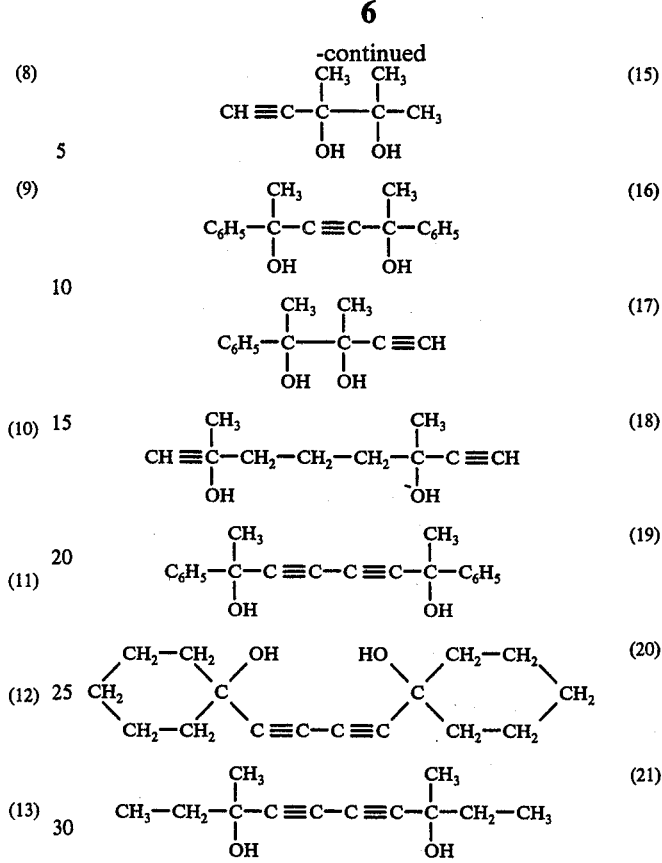

Among the above-mentioned acetylenically unsaturated alcohols, preferred ones should have a boiling point below 200° C, preferably, below 150° C.

Several of the examples of the acetylenically unsaturated compounds as component (d) in the composition of the present invention are the compounds expressed by the structural formulas mentioned below. These compounds can be obtained by the reaction of the above-mentioned isocyanate compounds and acetylenically unsaturated alcohols.

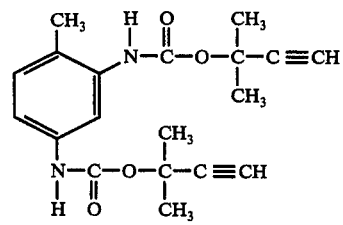

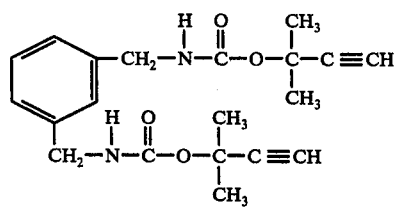

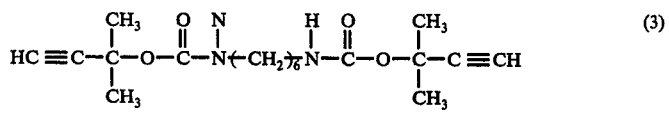

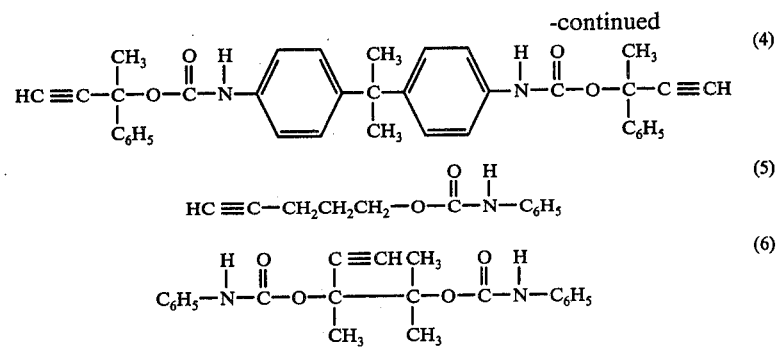

The compounds used as component (d) are readily decomposed upon heating when the compositions are subjected to curing at elevated temperatures, say, 150° C or higher to regenerate the isocyanate compound and the acetylenically unsaturated alcohol. The regenerated alcohol rapidly diffuses out of the composition under curing, thus leaving no possibility of retarding the curing velocity.

The amounts of component (d) to formulate the composition of the invention widely vary depending on the kind of the composition, the desired degree of the storage stability and other factors. It is preferable, however, that the amount is such that at least 2 moles of the acetylenic triple bonds are provided per mole of the platinum compound as component (c). It is one of the advantages of the present invention that the amount of this retarding agent can be determined within a much wider range than in the prior art, and without any deleterious effect on the cure.

The curable organopolysiloxane composition of the present invention can be obtained by uniformly blending components (a) to (d) optionally with additives. Such additives include inorganic fillers exemplified by siliceous compounds, such as silica aerogel, precipitated silica, diatomaceous earth, quartz powder, fused quartz powder, glass powder, magnesium silicate and aluminum silicate; metal oxides, such as titanium dioxide, aluminum oxide and zinc oxide; metal carbonates, such as calcium carbonate and magnesium carbonate; and inorganic fibrous materials, such as glass fibers, asbestos and carbon fibers; pigments, flame retardants, lubricants, and the like. When the intended composition is a silicone molding composition, an inorganic filler and a libricant are indispensable ingredients, and the amount of such filler and the lubricant are usually between 100 and 500% by weight and 0.1 and 5% by weight, respectively, based on the combined weight of components (a) and (b).

The organopolysiloxane compositions of the invention thus obtained are very stable at room temperature without gelation and can be stored for a long time. On the other hand, they are rapidly cured by application of heat to produce cured elastomers of desired shapes. The temperatures at which the composition is heated for curing should be in the range of from 70° to 200° C or, preferably, around the decomposition temperature of component (d).

The organopolysiloxane compositions of the present invention can find uses in various fields of application, for example, as material for the shaped articles of silicone rubbers and silicone resins, particularly in the form of a molding compound for transfer molding to meet the two requirements, which are contradictory to each other, say, high stability during storage and rapid cure during molding processes, and as material for potting and encapsulation as well.

The following examples will further illustrate the present invention. In the examples, parts are all parts by weight and the symbols Me, Et, Vi, and Ph denote methyl, ethyl, vinyl, and phenyl groups respectively.

EXAMPLE 1

A mixture was prepared by uniformly blending 15.4 parts of an organopolysiloxane composed of 55 mole % of $PhSiO_{1.5}$ units, 25 mole % of $Me_2SiO$ units and 20 mole % of MeViSiO units, 4.6 parts of a 2-phenylpropyl containing organohydrogenpolysiloxane expressed by the formula

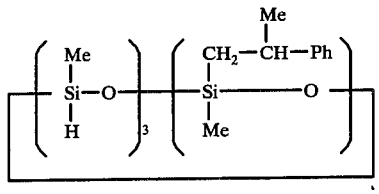

and 0.3 part of a solution of chloroplatinic acid in 2-ethylhexanol in a concentration of 2% as platinum. To the mixture was added 0.3 part of an acetylenically unsaturated compound A or B expressed by the following formula

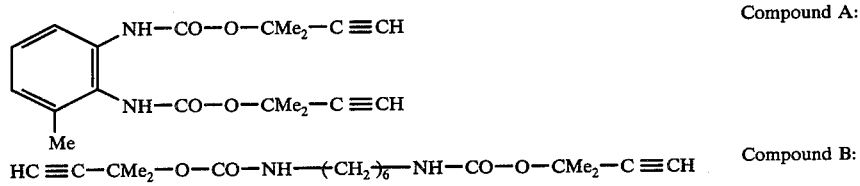

The resulting two compositions, being samples of this invention, were tested for their respective gelation time at varied temperatures. The results are set out in Table I.

For comparison, five compositions were prepared with the same formulation as above except that the addition of the acetylenically unsaturated compounds was 0.15 part of compound C, 0.25 part of compound D, 0.24 part of compound E, 0.17 part of compound F, or none, instead of 0.3 part of compound A or B, each of compounds C – F having the following formula.

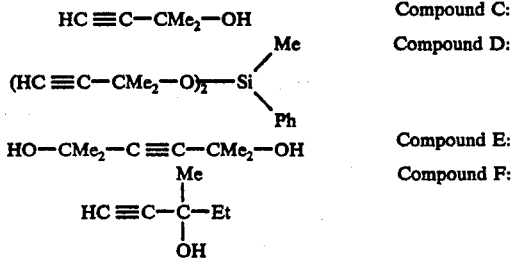

Compound C: HC≡C—CMe₂—OH

Compound D: (HC≡C—CMe₂—O)₂—Si(Me)(Ph)

Compound E: HO—CMe₂—C≡C—CMe₂—OH

Compound F: HC≡C—C(Me)(Et)—OH

These comparative samples were then tested to determine their respective gelation times at various temperatures. The results are shown also in Table I.

Table I

| Sample No. | Acetylenic compound | Gelation time, sec. | | |
|---|---|---|---|---|
| | | 750° C | 125° C | 95° C |
| 1 | A | 20 | 85 | 909 |
| 2 | B | 23 | 129 | 925 |
| 3* | C | 16 | 33 | 304 |
| 4* | D | 27 | 73 | 760 |
| 5* | E | 27 | 80 | 960 |
| 6* | F | 10 | 42 | 603 |
| 7* | None | 10 | 23 | 159 |

*Comparative sample

As is clear from the above table, the organopolysiloxane compositions in accordance with the present invention have a longer gelation time than the comparative compositions at 125° C or below, while the gelling velocity of the compositions of the invention is as high as that of the comparative compositions at 150° C. In the storage test, the comparative compositions became gelled in 7 days at room temperature, while the compositions of the invention exhibited only a slight increase in their viscosity.

EXAMPLE 2

A mixture was prepared by blending on a roller mill 100 parts of a diorganopolysiloxane with an average degree of polymerization of about 8,000 composed of 99.5 mole % of Me₂SiO units and 0.5 mole % of MeViSiO units with trimethylsilyl groups as the end-blocking groups, 40 parts of Aerosil 200 (trademark by DEGUSSA, West Germany) with a specific surface area of 200 m²/g and 5 parts of diphenylsilane diol. To the mixture, after having been heated at 150° C for 1 hour, were added 2.0 parts of a methylhydrogenpolysiloxane composed of Me₂HSiO₀.₅ units and SiO₂ units in a mole ratio of 2:1, 20 p.p.m. by weight of chloroplatinic acid based on the total amount of the organopolysiloxanes and the varied amounts of compound B of Example 1 as indicated in Table II.

The resulting organopolysiloxane compositions were tested for their respective gelation time determined at various temperatures. The results are as set out in the table.

For comparison, an organopolysiloxane composition was prepared with the same formulation as above excepting the omission of compound B. This comparative sample was then tested for its gelation time at varied temperatures, with the results as shown in the same table.

Table II

| Sample No. | Amount of compound B parts | Gelation time, sec. | | |
|---|---|---|---|---|
| | | 150° C | 85° C | 50° C |
| 8 | 0.1 | 13 | 102 | 480 |
| 9 | 0.5 | 20 | 120 | 634 |
| 10* | None | 3 | 32 | 90 |

*Comparative sample

EXAMPLE 3

Organopolysiloxane compositions were prepared each by blending 17.5 parts of a dimethylpolysiloxane having a viscosity of 3,000 centistokes at 25° C terminated at both chain ends with dimethylvinylsilyl groups, 7.5 parts of a methylvinylpolysiloxane composed of 39 mole % of Me₂SiO units, 5 mole % of Me₂ViSiO₀.₅ units and 56 mole % of SiO₂ units, 1.25 parts of a methylhydrogenpolysiloxane composed of 60 mole % of Me₂HSiO₀.₅ units and 40 mole % of SiO₂ units, 10 p.p.m. by weight of chloroplatinic acid based on the total amount of the organopolysiloxanes and, in addition, the varied amounts of compound A of Example 1 as indicated in Table III.

Each organopolysiloxane composition thus prepared was determined for its gelation time, with the results as set out in the table.

For comparison, comparative samples were prepared with the same formulation as above except that compound C of Example 1 was used instead of compound A or that the use of compound A and C was omitted, and gelation time was determined with the results as set out also in Table III.

Table III

| Sample No. | Acetylenic compound and amount, parts | Gelation time, sec. | | |
|---|---|---|---|---|
| | | 160° C | 120° C | 80° C |
| 11 | A, 0.15 | 11 | 33 | 565 |
| 12 | A, 0.25 | 13 | 52 | 860 |
| 13* | C, 0.08 | 10 | 38 | 190 |
| 14* | None | 3 | 10 | 58 |

*Comparative sample

It may be added that the above comparative samples 13 and 14 were found gelled in 24 and 3 hours, respectively, at room temperature, while samples 11 and 12 remained ungelled for more than a week at room temperature.

EXAMPLE 4.

An organopolysiloxane resin composition for transfer molding was prepared by blending 60 parts of an organopolysiloxane composed of 40 mole % of MeSiO₁.₅ units, 40 mole % of PhSiO₁.₅ units and 20 mole % of MeViSiO units, 18 parts of an organohydrogenpolysiloxane expressed by the formula

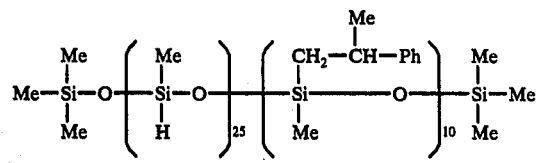

135.9 parts of finely divided fused quartz powder, 90.1 parts of glass fiber, 1.5 parts of carbon black, 0.4 part of cobalt stearate, 0.04 part of a solution of chloroplatinic acid in 2-ethylhexanol in a concentration of 2% as platinum and 1.2 parts of compound A of Example 1.

The thus prepared sample was subjected to the spiral flow test in order to determine its suitability as a transfer molding compound. The test was carried out on the sample immediately on preparation in one instance and after having been stored at 40° C for varied lengths of time, say, 24, 64 and 112 hours in other instances, to determine the respective spiral flow values. In the test, the metal mold employed was of the EMMI-1-6 type, while the molding temperature, time and pressure were 175° C, 3 minutes and 56 kg/cm², respectively. The results of the test are set out in Table IV.

For comparison, three compositions were prepared with the same formulation as above except that the addition of acetylenic compounds was 0.5 part of compound C, 1.0 part of compound D, or none, instead of 1.2 parts of compound A. The results are set out also in Table IV.

Table IV

| Sample No. | Acetylenic compound | Spiral Flow Value, inches | | | |
|---|---|---|---|---|---|
| | | Immediately | After 24 hrs. | After 64 hrs. | After 112 hrs. |
| 15 | A | 39.0 | 36.7 | 30.5 | 28.8 |
| 16* | C | 15.8 | 9.0 | 7.0 | 3.0 |
| 17* | D | ** | ** | ** | ** |
| 18* | None | 11.0 | 5.0 | 4.0 | 2.0 |

*Comparative sample.
**The sample did not cure under the testing conditions.

EXAMPLE 5

Organopolysiloxane resin compositions for transfer molding were prepared with the same formulation as in Example 4 in which compound A was replaced by compound B in the varied amounts as indicated in Table V. The spiral flow values of these compositions were determined in a similar manner, and the results are set out in the table.

Table V

| Sample No. | Amount of compound B parts | Spiral flow value, inches | | | |
|---|---|---|---|---|---|
| | | Immediately | After 24 hrs. | After 64 hrs. | After 112 hrs. | After 168 hrs. |
| 19 | 1.2 | 44.8 | 43.5 | 37.5 | 33.0 | 16.8 |
| 20 | 1.0 | 40.5 | 38.8 | 36.7 | 32.0 | 15.2 |
| 21 | 0.8 | 38.0 | 37.0 | 34.0 | 27.0 | 12.0 |
| 22 | 0.5 | 35.3 | 33.0 | 31.0 | 25.0 | 16.5 |

EXAMPLE 6

An organopolysiloxane resin composition for transfer molding was prepared by blending 60 parts of an organopolysiloxane composed of 40 mole % of MeSiO$_{1.5}$ units, 40 mole % of PhSiO$_{1.5}$ units and 20 mole % of MeViSiO units, 18 parts of an organopolysiloxane expressed by the formula

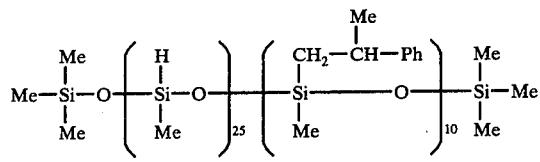

135.9 parts of a finely divided fused quartz powder, 90.1 parts of glass fiber, 1.5 parts of carbon black, 0.4 part of cobalt stearate, 0.04 part of a solution of chloroplatinic acid in 2-ethylhexanol in a concentration of 2% as platinum and 0.5 part of an acetylenically unsaturated compound G expressed by the following formula.

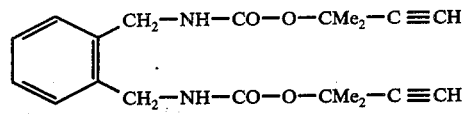

The spiral flow value of this sample composition thus prepared was determined and the results are set out in Table VI.

For comparison, three compositions were prepared with the same formulation as above except that 0.5 part of compound G was replaced by 0.26 part of compound H expressed by the formula

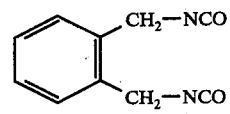

or by a combination of 0.26 part of the above-mentioned compound H and 0.24 part of the same compound C as used in Example 1 or that no addition of an acetylenic compound was made. The results are set out also in Table VI.

Table VI

| Sample No. | Acetylenic compound and amount, parts | Spiral flow value, inches |
|---|---|---|
| 23 | G, 0.5 | 39 |
| 24* | H, 0.26 | 10 |
| 25* | C, 0.24 | 17 |
| 26* | H, 0.26 None | 11 |

*Comparative sample

What is claimed is:
1. A curable organopolysiloxane composition comprising
(a) an organopolysiloxane having in a molecule at least two aliphatically unsaturated monovalent hydrocarbon groups bonded directly to the silicon atoms and expressed by the average unit formula

$$(R^1)_a SiO_{4-a/2}$$

where $R^1$ is a substituted or unsubstituted monovalent hydrocarbon group and $a$ is a positive number from 0.8 to 3.0 inclusive, (b) an organohydrogenpolysiloxane having in a molecule at least two hydrogen atoms bonded directly to the silicon atoms and expressed by the average unit formula $$(R^2)_b(H)_c SiO_{4-b-c/2}$$

where $R^2$ is a substituted or unsubstituted monovalent hydrocarbon group free of aliphatic unsaturation, $b$ is a positive number in the range of from 0.5 to 2.09 inclusive, and $c$ is a positive number in the range of from 0.01 to 1.2 inclusive, with the proviso that $b+c$ is between 1.0 and 3.0 inclusive, the amount of the organohydrogenpolysiloxane being such that from 0.6 to 2.5 hydrogen atoms bonded directly to the silicon atoms are provided per aliphatically unsaturated monovalent hydrocarbon group in component (a), (c) platinum or a platinum compound in a catalytic amount, and
(d) an organic compound having in a molecule at least one monovalent group represented by the general formula $$R^3-O-\overset{O}{\overset{\|}{C}}-\overset{H}{\overset{|}{N}}-$$

where $R^3$ is a monovalent hydrocarbon group having at least one acetylenic triple bond, the amount of the organic compound being such that at least two acetylenic triple bonds are provided per platinum atom in component (c).

2. The composition as claimed in claim 1 wherein said group $R^3$ is a group such that an alcohol expressed by the formula $R^3OH$ has a boiling point below 200° C.

3. The composition as claimed in claim 1 wherein said aliphatically unsaturated monovalent hydrocarbon group is selected from the class consisting of vinyl and allyl groups.

4. The composition as claimed in claim 1 wherein said group $R^1$ is a monovalent hydrocarbon group selected from the class consisting of alkyl and aryl groups.

5. The composition as claimed in claim 4 wherein said alkyl group is a methyl or ethyl group.

6. The composition as claimed in claim 4 wherein said aryl group is a phenyl group.

7. The composition as claimed in claim 1 wherein said group $R^2$ is selected from the class consisting of alkyl, aryl, and aralkyl groups.

8. The composition as claimed in claim 7 wherein said alkyl group is a methyl or ethyl group.

9. The composition as claimed in claim 7 wherein said aryl group is a phenyl group.

10. The composition as claimed in calim 7 wherein said aralkyl group is a β-phenylpropyl group.

11. The composition as claimed in claim 1 wherein component (c) is present in an amount of from 1 to 50 p.p.m. by weight as platinum based on the combined weight of components (a) and (b).

12. A curable organopolysiloxane molding composition comprising
(a) an organopolysiloxane having in a molecule at least two vinyl groups bonded directly to the silicon atoms and expressed by the average unit formula $$(R^1)_aSiO_{4-a/2}$$

where $R^1$ is a group selected from the class consisting of methyl, vinyl and phenyl groups and $a$ is a positive number in the range of from 1.0 to 1.8 inclusive, (b) an organohydrogenpolysiloxane having in a molecule at least two hydrogen atoms bonded directly to the silicon atoms and expressed by the average unit formula $$(R^2)_b(H)_cSiO_{4-b-c/2}$$

where $R^2$ is a group selected from the class consisting of methyl, phenyl and β-phenylpropyl groups, $b$ is a positive number in the range of from 0.5 to 2.09 inclusive and $c$ is a positive number in the range of from 0.01 to 1.2 inclusive, with the proviso that $b+c$ is between 1.0 and 3.0 inclusive, the amount of the organohydrogenpolysiloxane being such that from 0.6 to 2.5 hydrogen atoms bonded directly to the silicon atoms are provided per vinyl group in component (a).

(c) platinum or a platinum compound in a catalytic amount, and (d) an organic compound having in a molecule at least one monovalent group represented by the general formula $$R^3-O-\overset{O}{\overset{\|}{C}}-\overset{H}{\overset{|}{N}}-$$

where $R^3$ is a monovalent hydrocarbon group having at least one acetylenic triple bond, the amount of the organic compound being such that at least two acetylenic triple bonds are provided per platinum atom in component (c), (e) an inorganic filler in an amount of 100 to 500% by weight based on the combined weight of components (a) and (b), and (f) a lubricant.

* * * * *